US012567362B2

(12) United States Patent
Pyun et al.

(10) Patent No.: US 12,567,362 B2

(45) Date of Patent: Mar. 3, 2026

(54) DISPLAY DEVICE, METHOD OF DRIVING THE DISPLAY DEVICE, AND ELECTRONIC DEVICE INCLUDING THE DISPLAY DEVICE

(71) Applicant: Samsung Display Co., Ltd., Yongin-Si (KR)

(72) Inventors: Kihyun Pyun, Yongin-si (KR); Jungeon An, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/981,711

(22) Filed: Dec. 16, 2024

(65) Prior Publication Data

US 2025/0246125 A1 Jul. 31, 2025

(30) Foreign Application Priority Data

Jan. 30, 2024 (KR) ........................ 10-2024-0014249

(51) Int. Cl.

*G09G 3/32* (2016.01)

(52) U.S. Cl.

CPC ....... *G09G 3/32* (2013.01); *G09G 2300/0828* (2013.01); *G09G 2300/0842* (2013.01); *G09G 2310/08* (2013.01); *G09G 2330/021* (2013.01); *G09G 2330/025* (2013.01); *G09G 2330/028* (2013.01)

(58) Field of Classification Search

CPC ............. G09G 3/32; G09G 2300/0828; G09G 2300/0842; G09G 2310/08; G09G 2330/021; G09G 2330/025; G09G 2330/028

See application file for complete search history.

(56) References Cited

U.S. PATENT DOCUMENTS

| | | | | |
|---|---|---|---|---|
| 8,817,008 | B2 | 8/2014 | Park et al. | |
| 11,216,108 | B2 | 1/2022 | Kim et al. | |
| 2022/0254300 | A1 * | 8/2022 | Pyun | G09G 3/3233 |
| 2023/0246151 | A1 | 8/2023 | Kim et al. | |
| 2024/0282264 | A1 * | 8/2024 | Pyun | G09G 3/3233 |

FOREIGN PATENT DOCUMENTS

| | | | |
|---|---|---|---|
| KR | 10-1040786 | B1 | 6/2011 |
| KR | 10-2018-0003745 | A | 1/2018 |
| KR | 10-2021-0042202 | A | 4/2021 |
| KR | 10-2023-0117014 | A | 8/2023 |
| KR | 10-2024-0128178 | A | 8/2024 |

* cited by examiner

*Primary Examiner* — Andrew Sasinowski

(74) *Attorney, Agent, or Firm* — Innovation Counsel LLP

(57) ABSTRACT

A display device comprises a display panel including pixels, a panel current sensor configured to sense a panel current of the display panel, and generate an overcurrent alert signal when the panel current is greater than a limit current, a driving controller configured to generate an overcurrent prevention enable signal for determining whether to turn on an overcurrent prevention mode based on the overcurrent alert signal, and an initialization voltage generator configured to control an initialization voltage applied to the pixels in response to the overcurrent prevention enable signal.

24 Claims, 7 Drawing Sheets

DISPLAY DEVICE, METHOD OF DRIVING THE DISPLAY DEVICE, AND ELECTRONIC DEVICE INCLUDING THE DISPLAY DEVICE

This application claims priority under 35 USC § 119 to Korean Patent Application No. 10-2024-0014249 filed on Jan. 30, 2024, in the Korean Intellectual Property Office (KIPO), the entire disclosure of which is incorporated by reference herein.

BACKGROUND

1. Field

Embodiments of the present inventive concept relates to a display device and a method of driving the same. More particularly, the present inventive concept relates to a display device, a method of driving the display device, and an electronic device including the display device for preventing an overcurrent of a panel current to reduce a power consumption.

2. Description of the Related Art

In general, a display device includes a display panel and a display panel driver. The display panel includes gate lines, data lines, and pixels. The display panel driver includes a gate driver for providing gate signals to the gate lines, a data driver for providing data voltages to the data lines, and a driving controller for controlling the gate driver and the data driver.

When a load of input image data increases, a panel current of the display panel may increase and a power consumption may increase.

SUMMARY

Embodiments of the present inventive concept provide a display device for preventing an overcurrent of a panel current to reduce a power consumption.

Embodiments of the present inventive concept provide a method of driving the display device.

Embodiments of the present inventive concept provide an electronic device including the display device.

In an embodiment of a display device according to the present inventive concept, the display device comprises a display panel including pixels, a panel current sensor configured to sense a panel current of the display panel, and generate an overcurrent alert signal when the panel current is greater than a limit current, a driving controller configured to generate an overcurrent prevention enable signal for determining whether to turn on an overcurrent prevention mode based on the overcurrent alert signal, and an initialization voltage generator configured to control an initialization voltage applied to the pixels in response to the overcurrent prevention enable signal.

In an embodiment, the initialization voltage generator may include an overcurrent prevention transistor turned on in response to the overcurrent prevention enable signal, and a non-inverting amplifier connected to the overcurrent prevention transistor and configured to generate the initialization voltage.

In an embodiment, each of the pixels may include a first pixel transistor including a gate terminal connected to a first pixel node, a first terminal receiving a high power voltage, and a second terminal connected to a second pixel node, a second pixel transistor including a gate terminal receiving a first gate signal, a first terminal receiving a data voltage, and a second terminal connected to the first pixel node, a third pixel transistor including a gate terminal receiving a second gate signal, a first terminal receiving the initialization voltage, and a second terminal connected to the second pixel node, a storage capacitor including a first terminal connected to the first pixel node and a second terminal connected to the second pixel node, and a light emitting element including an anode terminal connected to the second pixel node and a cathode terminal receiving a low power voltage lower than the high power voltage.

In an embodiment, the overcurrent prevention transistor may include a gate terminal receiving the overcurrent prevention enable signal, a first terminal receiving a ground voltage, and a second terminal, and the non-inverting amplifier may include a first resistor including a first terminal connected to the second terminal of the overcurrent prevention transistor, and a second terminal, a second resistor including a first terminal connected to the second terminal of the first resistor, and a second terminal, and an amplifier including a non-inverting input terminal receiving a code voltage, an inverting input terminal connected to the second terminal of the first resistor and the first terminal of the second resistor, and an output terminal through which the initialization voltage is output.

In an embodiment, a resistance value of the second resistor may be less than a resistance value of the first resistor.

In an embodiment, the overcurrent prevention transistor may be an N-type transistor.

In an embodiment, when a panel current of a first duration is less than or equal to the limit current, the overcurrent prevention enable signal may have an inactive level, the overcurrent prevention mode may be turned off, and the initialization voltage may be a first initialization voltage, and when a panel current of a second duration following the first duration is greater than the limit current, the overcurrent prevention enable signal may have an active level, the overcurrent prevention mode may be turned on, and the initialization voltage may be a second initialization voltage higher than the first initialization voltage.

In an embodiment, in the first duration, the overcurrent prevention transistor may be turned off in response to the overcurrent prevention enable signal having the inactive level, and a voltage gain of the non-inverting amplifier may be 1.

In an embodiment, in the first duration, the initialization voltage output from the output terminal of the amplifier may be the first initialization voltage.

In an embodiment, in the second duration, the overcurrent prevention transistor may be turned on in response to the overcurrent prevention enable signal having the active level, and a voltage gain of the non-inverting amplifier may be "1+R_R2/R_R1". Here, R_R1 is a resistance value of the first resistor and R_R2 is a resistance value of the second resistor.

In an embodiment, in the second duration, the initialization voltage output from the output terminal of the amplifier may be the second initialization voltage which is a product of the code voltage and the voltage gain of the non-inverting amplifier.

In an embodiment, in a third duration following the second duration, the overcurrent prevention enable signal may have the active level, the overcurrent prevention mode may be turned on, and the initialization voltage may be a third initialization voltage greater than the first initialization voltage and less than the second initialization voltage.

In an embodiment, the overcurrent prevention enable signal may be generated based on the overcurrent alert signal, and the initialization voltage generator may further include a digital-to-analog converter configured to generate the code voltage based on the initialization voltage code.

In an embodiment, in the third duration, the driving controller may be configured to decrease the initialization voltage code to generate a correction initialization voltage code and the digital-to-analog converter may be configured to generate a correction code voltage based on the correction initialization voltage code.

In an embodiment, in the third duration, the overcurrent prevention transistor may be turned on in response to the overcurrent prevention enable signal having the active level, and a voltage gain of the non-inverting amplifier may be "1+R_R2/R_R1". Here, R_R1 is a resistance value of the first resistor and R_R2 is a resistance value of the second resistor.

In an embodiment, in the third duration, the initialization voltage output from the output terminal of the amplifier may be the third initialization voltage which is a product of the correction code voltage and "1+R_R2/R_R1".

In an embodiment of a method of driving a display device according to the present inventive concept, the method comprises sensing a panel current of a display panel including pixels, generating an overcurrent alert signal when the panel current is greater than a limit current, and generating an overcurrent prevention enable signal for determining whether to turn on an overcurrent prevention mode based on the overcurrent alert signal and outputting the overcurrent prevention enable signal to an initialization voltage generator. The initialization voltage generator is configured to control an initialization voltage applied to the pixels in response to the overcurrent prevention enable signal.

In an embodiment, the initialization voltage generator may include an overcurrent prevention transistor turned on in response to the overcurrent prevention enable signal, and a non-inverting amplifier connected to the overcurrent prevention transistor and configured to generate the initialization voltage.

In an embodiment, the overcurrent prevention transistor may include a gate terminal receiving the overcurrent prevention enable signal, a first terminal receiving a ground voltage, and a second terminal, and the non-inverting amplifier may include a first resistor including a first terminal connected to the second terminal of the overcurrent prevention transistor, and a second terminal, a second resistor including a first terminal connected to the second terminal of the first resistor, and a second terminal, and an amplifier including a non-inverting input terminal receiving a code voltage, an inverting input terminal connected to the second terminal of the first resistor and the first terminal of the second resistor, and an output terminal through which the initialization voltage is output.

In an embodiment, when a panel current of a first duration is less than or equal to the limit current, the overcurrent prevention enable signal has an inactive level, the overcurrent prevention mode may be turned off, and the initialization voltage may be a first initialization voltage, and when a panel current of a second duration following the first duration is greater than the limit current, the overcurrent prevention enable signal may have an active level, the overcurrent prevention mode may be turned on, and the initialization voltage may be a second initialization voltage higher than the first initialization voltage.

In an embodiment, in the first duration, the overcurrent prevention transistor may be turned off in response to the overcurrent prevention enable signal having the inactive level, and a voltage gain of the non-inverting amplifier may be 1.

In an embodiment, in the second duration, the overcurrent prevention transistor may be turned on in response to the overcurrent prevention enable signal having the active level, and a voltage gain of the non-inverting amplifier may be "1+R_R2/R_R1". Here, R_R1 is a resistance value of the first resistor and R_R2 is a resistance value of the second resistor.

In an embodiment, in a third duration following the second duration, the overcurrent prevention enable signal may have the active level, the overcurrent prevention mode may be turned on, and the initialization voltage may be a third initialization voltage greater than the first initialization voltage and less than the second initialization voltage.

In an embodiment, the overcurrent prevention enable signal may be generated based on the overcurrent alert signal, and the initialization voltage generator may further include a digital-to-analog converter configured to generate a code voltage based on the initialization voltage code.

In an embodiment, in the third duration, the overcurrent prevention transistor may be turned on in response to the overcurrent prevention enable signal having the active level, and a voltage gain of the non-inverting amplifier may be "1+R_R2/R_R1". Here, R_R1 is a resistance value of the first resistor and R_R2 is a resistance value of the second resistor.

In an embodiment of an electronic device according to the present inventive concept, the electronic device comprises a display panel including pixels, a panel current sensor configured to sense a panel current of the display panel, and generate an overcurrent alert signal when the panel current is greater than a limit current, a driving controller configured to generate an overcurrent prevention enable signal for determining whether to turn on an overcurrent prevention mode based on the overcurrent alert signal, an initialization voltage generator configured to control an initialization voltage applied to the pixels in response to the overcurrent prevention enable signal, and a processor configured to control the driving controller.

According to the display device, the display device may include the initialization voltage generator, the initialization voltage generator may include the digital-to-analog converter, the overcurrent prevention transistor, and the non-inverting amplifier, such that the initialization voltage may have a larger voltage in the overcurrent prevention mode than in the normal mode. Specifically, the overcurrent prevention transistor is turned on such that the voltage gain of the non-inverting amplifier may increase and thus the initialization voltage may increase. Accordingly, the panel current may be prevented from becoming the overcurrent.

Additionally, the overcurrent prevention mode may be maintained and the initialization voltage may be gradually reduced. Specifically, the overcurrent prevention transistor may be turned on and the initialization voltage code may be reduced. Accordingly, a luminance change of the display panel may be prevented from being visible to a user.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, the present inventive concept will be described in more detail with reference to the accompanying drawings.

Figure 1:
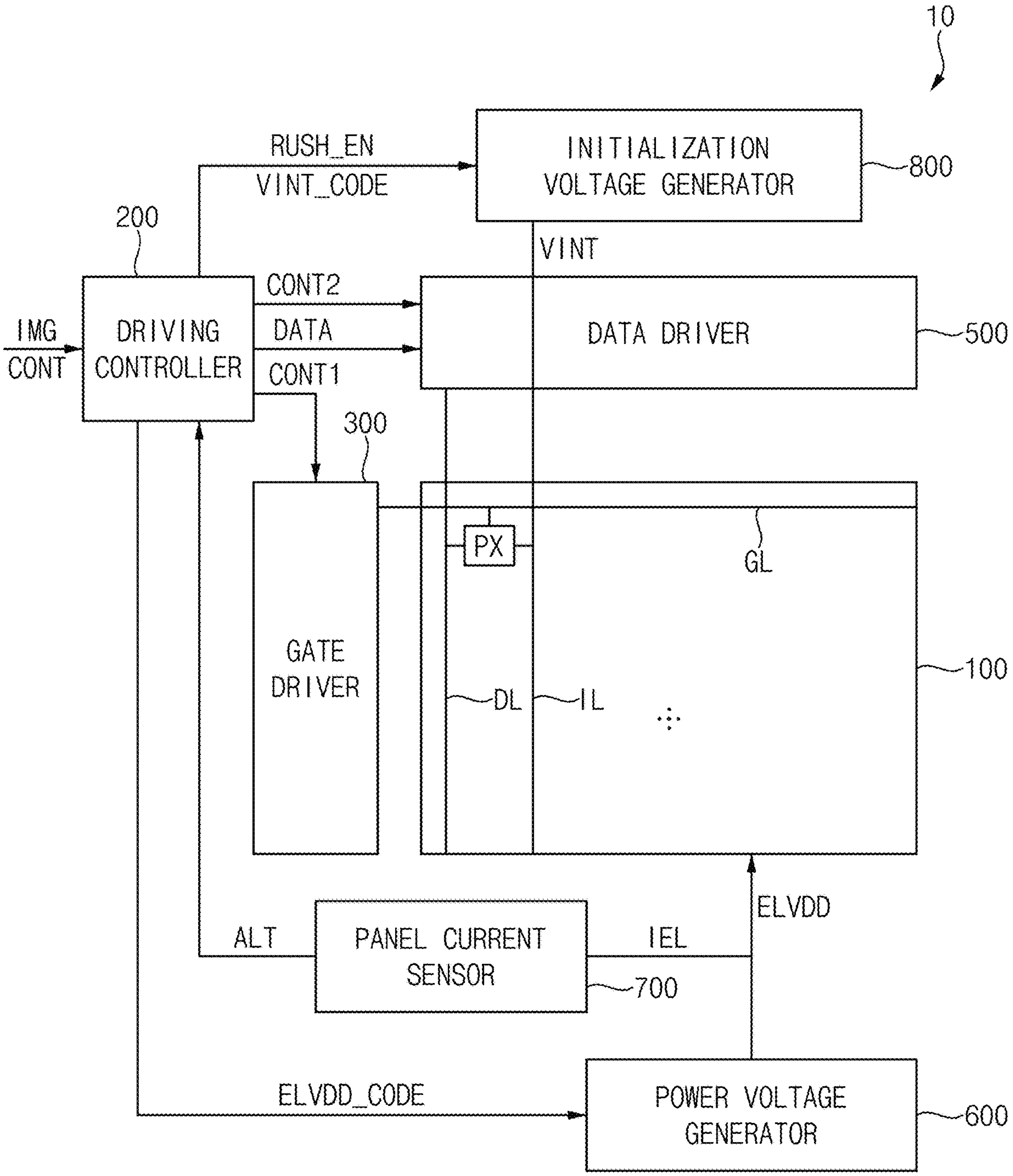
FIG. 1 is a block diagram illustrating a display device according to embodiments of the present inventive concept.

FIG. 1 is a block diagram illustrating a display device 10 according to embodiments of the present inventive concept.

Referring to FIG. 1, a display device 10 may include a display panel 100 and a display panel driver. The display panel driver may include a driving controller 200, a gate driver 300, and a data driver 500. The display panel driver may further include a power voltage generator 600, a panel current sensor 700, and an initialization voltage generator 800.

The display panel 100 may include a display area for displaying an image and a peripheral area disposed adjacent to the display area.

The display panel 100 may include gate lines GL, data lines DL, initialization lines IL, and pixels electrically connected to the gate lines GL, the data lines DL, and the initialization lines IL, respectively. The gate lines GL may extend in a first direction, the data lines DL may extend in a second direction crossing the first direction and the initialization lines IL may extend in the second direction.

The driving controller 200 may receive input image data IMG and an input control signal CONT from an external device (not shown). For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The gate driver 300 may generate gate signals for driving the gate lines GL based on the first control signal CONT1 received from the driving controller 200. The gate driver 300 may output the gate signals to the gate lines GL.

The data driver 500 may receive the second control signal CONT2 and the data signal DATA from the driving controller 200. The data driver 500 may convert the data signal DATA into a data voltage having an analog type. The data driver 500 may output the data voltage to the data lines DL.

The driving controller 200 may generate a high power voltage code ELVDD_CODE for driving the power voltage generator 600. The high power voltage code ELVDD_CODE may be a preset digital code.

The power voltage generator 600 may receive the high power voltage code ELVDD_CODE from the driving controller 200. The power voltage generator 600 may generate a high power voltage ELVDD based on the high power voltage code ELVDD_CODE. The high power voltage ELVDD may be a voltage corresponding to the high power voltage code ELVDD_CODE and may be a voltage for driving the display panel 100. The power voltage generator 600 may output the high power voltage ELVDD to the display panel 100.

The panel current sensor 700 may sense a panel current IEL of the display panel 100. The panel current IEL may be a sum of the driving currents of the pixels PX. The panel current IEL may be a current flowing through a line to which the high power voltage ELVDD is applied. The panel current sensor 700 may compare the panel current IEL with a limit current to generate an overcurrent alert signal ALT. For example, when the panel current IEL is greater than the limit current, the panel current sensor 700 may generate an overcurrent alert signal ALT having an active level. For example, when the panel current IEL is less than or equal to the limit current, the panel current sensor 700 may generate an overcurrent alert signal ALT having an inactive level. The panel current sensor 700 may output the overcurrent alert signal ALT to the driving controller 200.

The driving controller 200 may generate an initialization voltage code VINT_CODE for driving the initialization voltage generator 800. The initialization voltage code VINT_ CODE may be a preset digital code. Additionally, the driving controller 200 may generate an overcurrent prevention enable signal RUSH_EN for controlling an operation of the initialization voltage generator 800 based on the overcurrent alert signal ALT.

The initialization voltage generator 800 may receive the initialization voltage code VINT_CODE and the overcurrent prevention enable signal RUSH_EN from the driving controller 200. The initialization voltage generator 800 may generate an initialization voltage VINT for driving the initialization lines IL based on the initialization voltage code VINT_CODE. The initialization voltage VINT may be a voltage for initializing the display panel 100. The initialization voltage generator 800 may output the initialization voltage VINT to the display panel 100.

Figure 2:
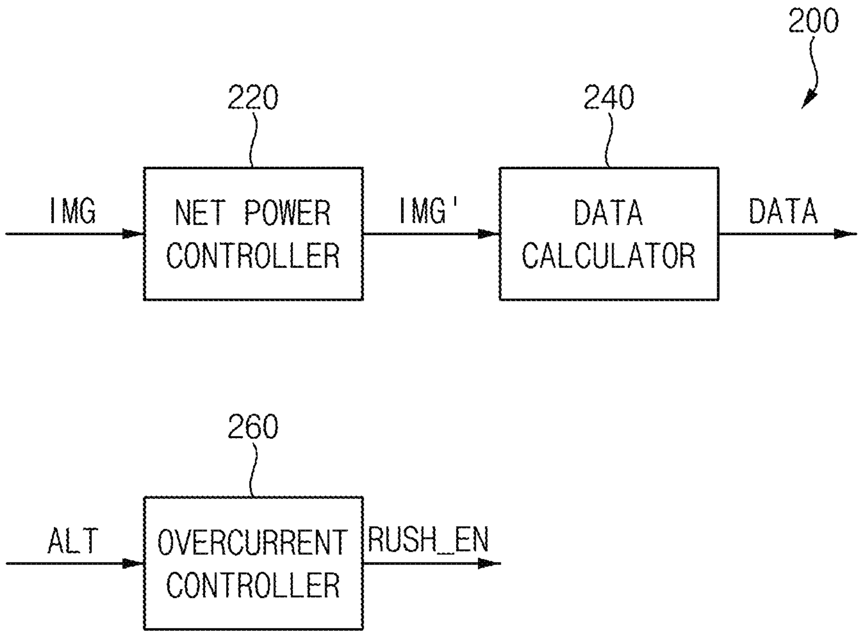
FIG. 2 is a block diagram illustrating a driving controller of FIG. 1.

FIG. 2 is a block diagram illustrating a driving controller 200 of FIG. 1.

Referring to FIGS. 1 and 2, the driving controller 200 may include a net power controller 220, a data calculator 240, and an overcurrent controller 260.

The net power controller 220 may generate corrected image data IMG' based on input image data IMG. Specifically, the net power controller 220 may correct the input image data IMG based on a load of the input image data IMG to generate the corrected image data IMG'.

For example, when the load of the input image data IMG is less than or equal to a limit load, the net power controller 220 may maintain a grayscale of the input image data IMG to generate the corrected image data IMG'. For example, when the load of the input image data IMG is greater than the limit load, the net power controller 220 may reduce the grayscale of the input image data IMG to generate the corrected image data IMG'. When the load of the input image data IMG is greater than the limit load, a net power control operation may be turned on.

The net power controller 220 may need a certain time for determining the load of the input image data IMG, such that a 1 frame delay may be applied to the net power control operation. For example, when a load of input image data IMG of a first frame is greater than the limit load, the net power control operation may be turned on in a second frame after the first frame.

The data calculator 240 may receive the corrected image data IMG'. The data calculator 240 may calculate the data signal DATA based on the corrected image data IMG'.

The overcurrent controller 260 may receive the overcurrent alert signal ALT. The overcurrent controller 260 may generate an overcurrent prevention enable signal RUSH_EN for controlling an operation of an initialization voltage generator 800 based on the overcurrent alert signal ALT.

Figure 3:
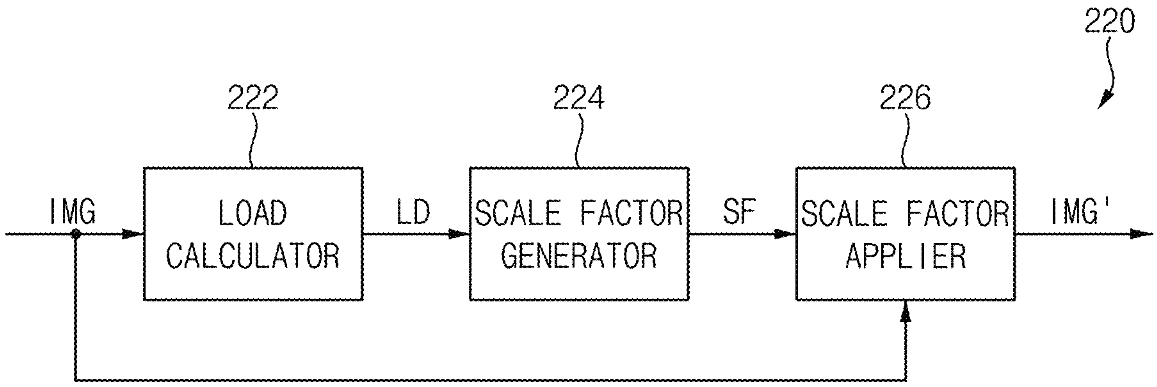
FIG. 3 is a block diagram illustrating a net power controller of FIG. 2.

FIG. 3 is a block diagram illustrating a net power controller 220 of FIG. 2.

Referring to FIGS. 1 to 3, the net power controller 220 may include a load calculator 222, a scale factor generator 224, and a scale factor applier 226.

The load calculator 222 may receive input image data IMG. The load calculator 222 may calculate a load LD of the input image data IMG based on the grayscale of the input image data IMG. The load calculator 222 may calculate the load LD of the input image data IMG per one frame. For example, when input image data IMG of the one frame is full black, the load LD of the input image data IMG may be 0%. For example, when the input image data IMG of the one frame is full white, the load LD of the input image data IMG may be 100%.

The scale factor generator 224 may generate a scale factor SF based on the load LD of the input image data IMG. For example, the scale factor SF may be greater than or equal to 0 and less than or equal to 1.

The scale factor applier 226 may applying the scale factor SF to the input image data IMG to generate the corrected image data IMG'. For example, when the scale factor SF is 0.5, the corrected image data IMG' in which the grayscale of the input image data IMG is reduced by a half may be generated.

Figure 4:
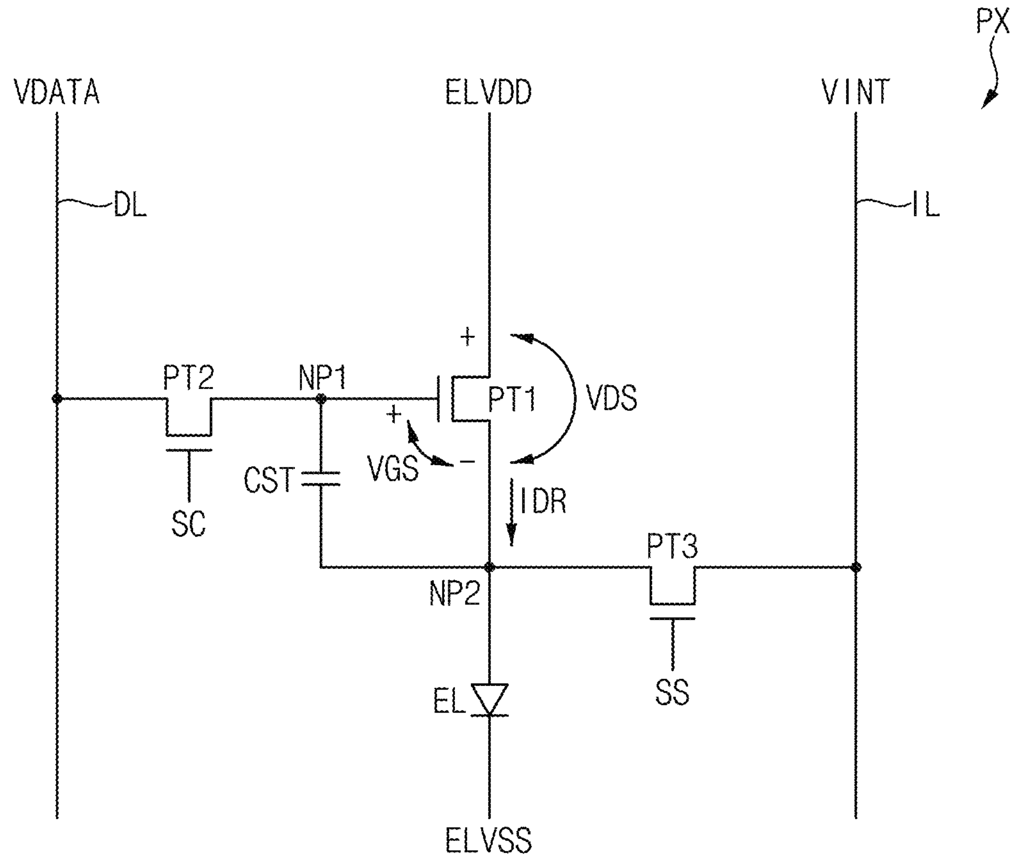
FIG. 4 is a circuit diagram illustrating a pixel of FIG. 1.

FIG. 4 is a circuit diagram illustrating a pixel PX of FIG. 1.

Referring to FIGS. 1 to 4, a pixel PX may include a first pixel transistor PT1, a second pixel transistor PT2, a third pixel transistor PT3, a storage capacitor CST, and a light emitting element EL.

The first pixel transistor PT1 may have a gate terminal connected to a first pixel node NP1, a first terminal receiving a high power voltage ELVDD, and a second terminal connected to a second pixel node NP2. The second pixel transistor PT2 may have a gate terminal receiving a first gate signal SC, a first terminal receiving a data voltage VDATA, and a second terminal connected to the first pixel node NP1. The third pixel transistor PT3 may have a gate terminal receiving a second gate signal SS, a first terminal receiving the initialization voltage VINT, and a second terminal connected to the second pixel node NP2. The storage capacitor CST may include a first terminal connected to the first pixel node NP1 and a second terminal connected to the second pixel node NP2. The light emitting element EL may include an anode terminal connected to the second pixel node NP2 and a cathode terminal receiving a low power voltage ELVSS lower than the high power voltage ELVDD. In an embodiment, the first pixel transistor PT1, the second pixel transistor PT2, and the third pixel transistor PT3 may be N-type transistors.

The second pixel transistor PT2 may output the data voltage VDATA to the first pixel node NP1 in response to the first gate signal SC. The third pixel transistor PT3 may output the initialization voltage VINT to the second pixel node NP2 in response to the second gate signal SS.

The first pixel transistor PT1 may be a driving transistor. The first pixel transistor PT1 may generate a driving current IDR based on a gate-source voltage VGS of the first pixel transistor PT1 and a drain-source voltage VDS of the first pixel transistor PT1.

The light emitting element EL may emit a light based on the driving current IDR, and a luminance of the display panel 100 may be determined by an amount of the driving current IDR.

Figure 5:
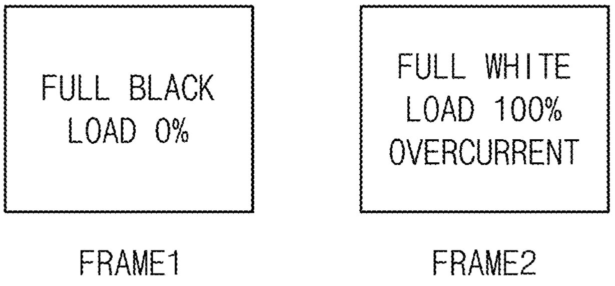
FIG. 5 is a conceptual diagram illustrating an example of a driving timing of a display device of FIG. 1.

FIG. 5 is a conceptual diagram illustrating an example of a driving timing of a display device 10 of FIG. 1.

Referring to FIGS. 1 to 5, when input image data IMG of a first frame FRAME1 is full black, a load LD of the input image data IMG of the first frame FRAME1 may be 0%. A panel current IEL of the first frame FRAME1 may be substantially zero which is less than or equal to a limit current. Because the panel current IEL of the first frame FRAME1 may not be an overcurrent, the display device 10 may operate in a normal mode.

When input image data IMG of a second frame FRAME2 after the first frame FRAME1 is full white, a load LD of the input image data IMG of the second frame FRAME2 may be 100%. The panel current IEL of the second frame FRAME2 may be greater than the limit current. Because the panel current IEL of the second frame FRAME2 may be the overcurrent, the display device 10 may operate in an overcurrent prevention mode. The overcurrent prevention mode may be turn-on immediately when the panel current IEL is greater than the limit current. That is, a turn-on time of the overcurrent prevention mode may be a time when the panel current IEL becomes greater than the limit current.

In order to reduce the panel current IEL, an initialization voltage generator 800 may increase the initialization voltage VINT. A gate-source voltage VGS of a first pixel transistor PT1 may be a voltage difference between a first pixel node NP1 which has a data voltage VDATA and a second pixel node NP2 which has the initialization voltage VINT. Therefore, when the initialization voltage VINT increases, the panel current IEL may decrease and become less than or equal to the limit current because the gate-source voltage VGS of a first pixel transistor PT1 decreases.

Figure 6:
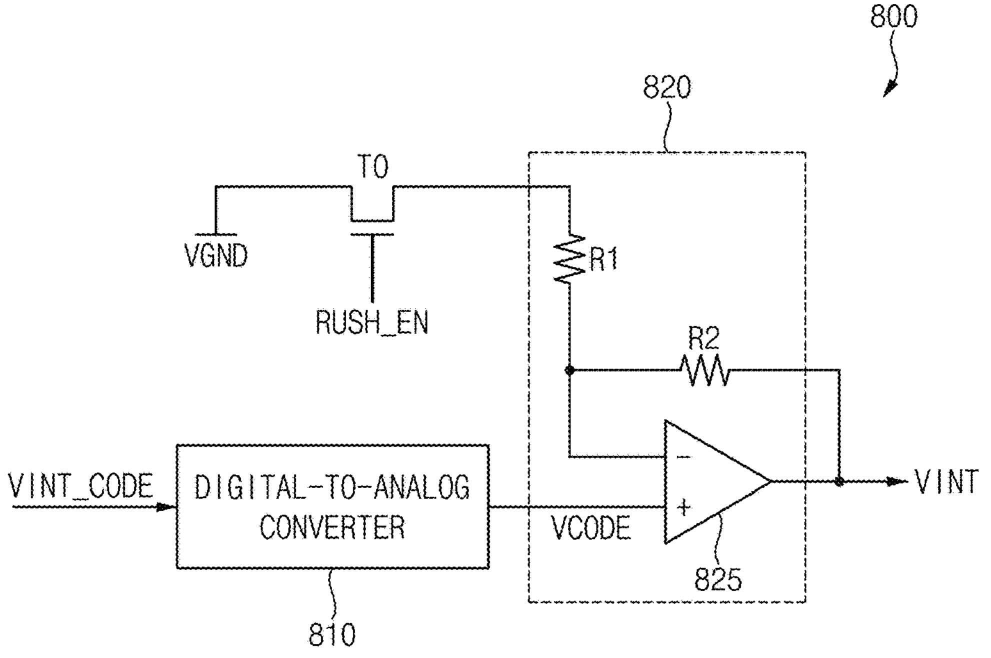
FIG. 6 is a circuit diagram illustrating an initialization voltage generator of FIG. 1.

FIG. 6 is a circuit diagram illustrating an initialization voltage generator 800 of FIG. 1.

Referring to FIGS. 1 to 6, an initialization voltage generator 800 may include a digital-to-analog converter 810, an overcurrent prevention transistor TO, and a non-inverting amplifier 820.

The digital-to-analog converter 810 may generate a code voltage VCODE based on an initialization voltage code VINT_CODE. The initialization voltage code VINT_CODE may be a preset digital code, and the code voltage VCODE may be a voltage corresponding to the initialization voltage code VINT_CODE.

The overcurrent prevention transistor TO may include a gate terminal receiving an overcurrent prevention enable signal RUSH_EN, a first terminal receiving a ground voltage VGND, and a second terminal. The overcurrent prevention transistor TO may be turned on in response to the overcurrent prevention enable signal RUSH_EN. Specifically, the overcurrent prevention transistor TO may be turned off in response to an overcurrent prevention enable signal RUSH_EN having an inactive level, and may be turned on in response to an overcurrent prevention enable signal RUSH_EN having an active level. In an embodiment, the overcurrent prevention transistor TO may be an N-type transistor. An inactive level of the N-type transistor may be a low level and an active level of the N-type transistor may be a high level.

The non-inverting amplifier 820 may include a first resistor R1, a second resistor R2, and an amplifier 825. In an embodiment, a resistance value of the second resistor R2 may be less than a resistance value of the first resistor R1. The first resistor R1 may include a first terminal connected to the second terminal of the overcurrent prevention transistor TO and a second terminal. The second resistor R2 may include a first terminal connected to the second terminal of the first resistor R1 and a second terminal. The amplifier 825 may have a non-inverting input terminal receiving the code voltage VCODE, an inverting input terminal connected to the second terminal of the first resistor R1 and the first terminal of the second resistor R2, and an output terminal connected to the second terminal of the second resistor R2. An initialization voltage VINT may be output from the output terminal of the amplifier 825.

Figure 7:
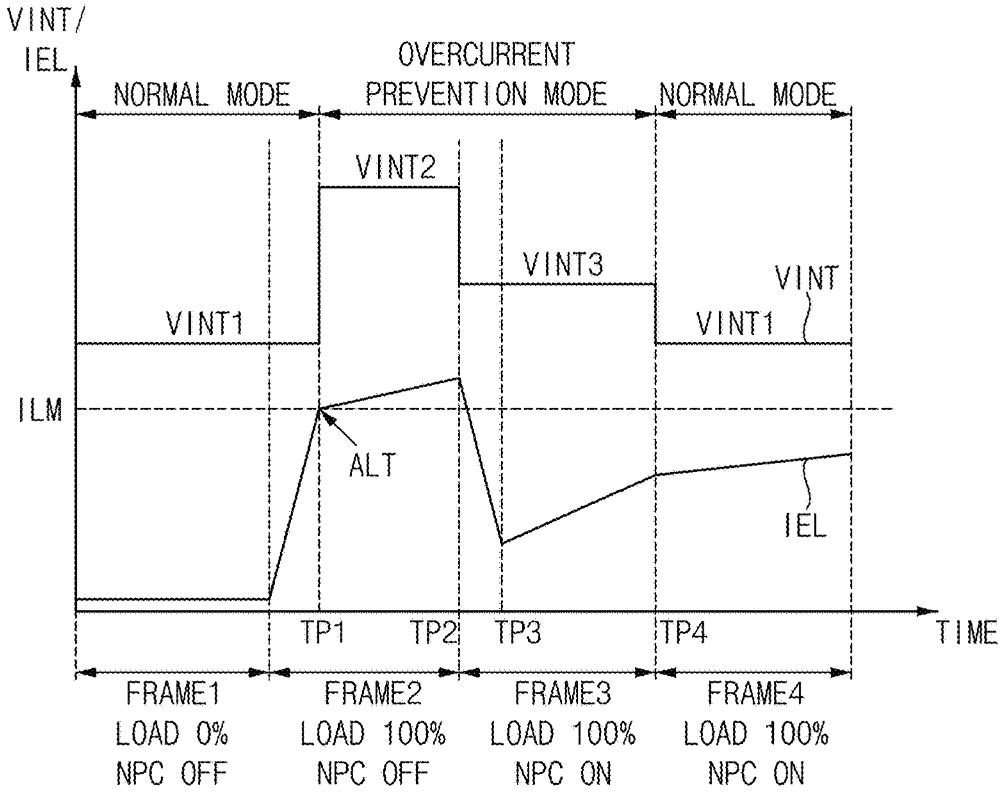
FIG. 7 is a timing diagram illustrating an operation of an initialization voltage generator of FIG. 6.
Figure 8:
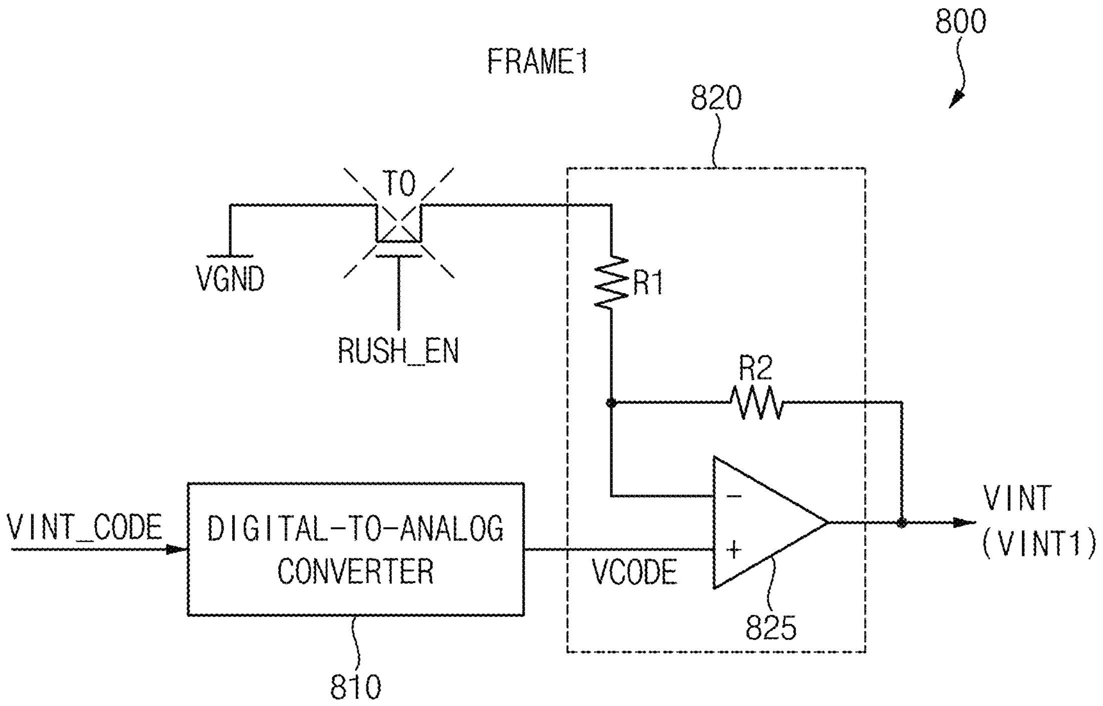
FIG. 8 is a circuit diagram illustrating an operation of an initialization voltage generator of FIG. 6 in normal mode.
Figure 9:
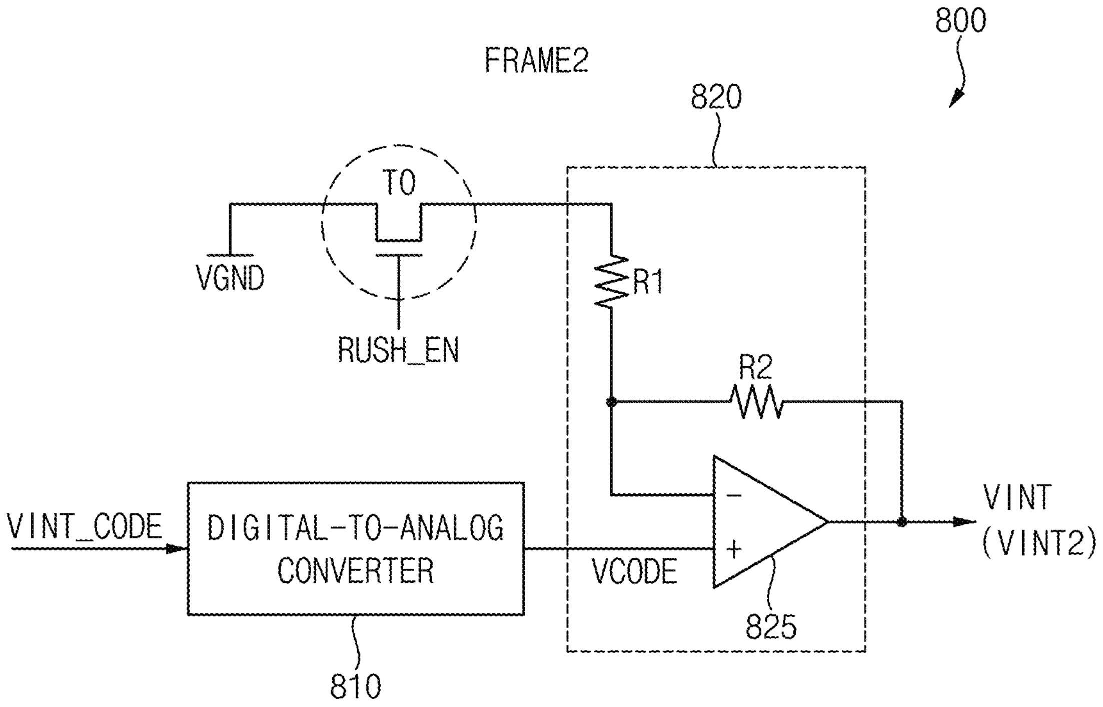
FIGS. 9 and 10 are circuit diagrams illustrating an operation of an initialization voltage generator of FIG. 6 in an overcurrent prevention mode.
Figure 10:
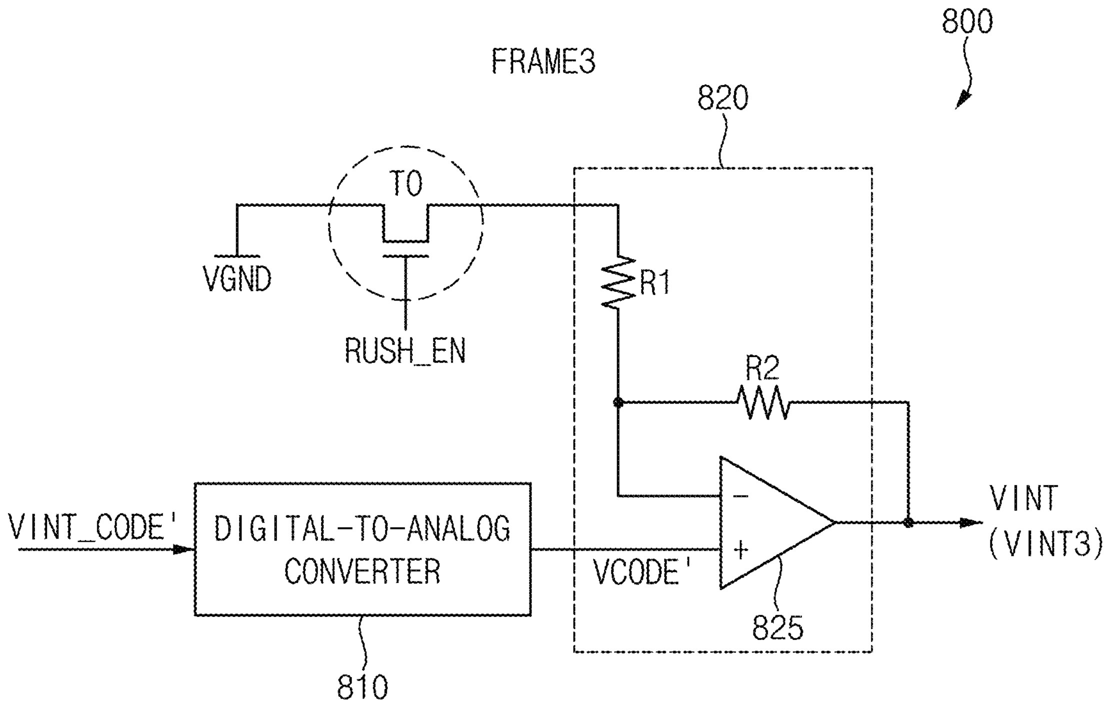
Figure 11:
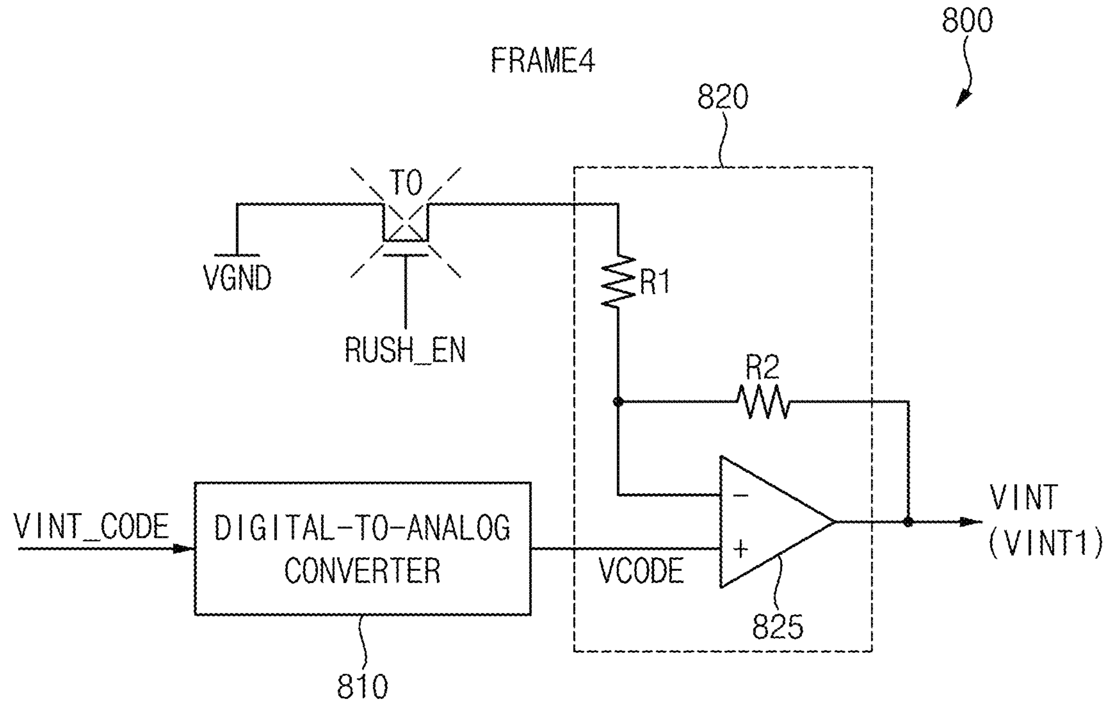
FIG. 11 is a circuit diagram illustrating an operation of an initialization voltage generator of FIG. 6 in a normal mode.

FIG. 7 is a timing diagram illustrating an operation of an initialization voltage generator 800 of FIG. 6. FIG. 8 is a circuit diagram illustrating an operation of an initialization voltage generator 800 of FIG. 6 in a normal mode. FIGS. 9 and 10 are circuit diagrams illustrating an operation of an initialization voltage generator 800 of FIG. 6 in an overcurrent prevention mode. FIG. 11 is a circuit diagram illustrating an operation of an initialization voltage generator 800 of FIG. 6 in a normal mode.

Referring to FIGS. 1 to 11, an initialization voltage generator 800 may operate in a first duration, a second duration, a third duration, and a fourth duration. In an embodiment, a length of each of the first to fourth durations may be longer than one frame. In another embodiment, the length of the each of the first to fourth sections may be shorter than or equal to the one frame.

FIG. 7 illustrates a case where the length of the each of the first to fourth durations is equal to the one frame for a convenience of an explanation.

A load LD of input image data IMG of a first frame FRAME1 may be 0%. A panel current IEL of the first frame FRAME1 may be less than or equal to a limit current ILM, thus the panel current IEL of the first frame FRAME1 may not be an overcurrent.

Since the panel current IEL of the first frame FRAME1 is less than or equal to the limit current ILM, the display device 10 may operate in a normal mode. During the first frame FRAME1, a panel current sensor 700 may generate an overcurrent alert signal ALT having an inactive level, and a driving controller 200 may generate an overcurrent prevention enable signal RUSH_EN having the inactive level based on the overcurrent alert signal ALT having the inactive level.

An overcurrent prevention transistor TO may be turned off in response to the overcurrent prevention enable signal RUSH_EN having the inactive level, thus a voltage gain of a non-inverting amplifier 825 may be 1 in the first frame FRAME1. Therefore, a digital-to-analog converter 810 may generate a code voltage VCODE based on an initialization voltage code VINT_CODE, and the initialization voltage VINT generated by the initialization voltage generator 800 may the first initialization voltage VINT1 which is the same as the code voltage VCODE. For example, the code voltage VCODE corresponding to the initialization voltage code VINT_CODE may be 6V, and the initialization voltage VINT may be 6V. A net power control operation may be turned off in the first frame FRAME1.

A load LD of input image data IMG of a second frame FRAME2 following the first frame FRAME1 may be 100%. Since a data voltage VDATA is sequentially applied to the pixels PX on a row-by-row basis, a driving current IDR of each of the pixels PX may sequentially increase on the row-by-row basis. Therefore, a panel current IEL of the second frame FRAME2 may increase. The panel current IEL of the second frame FRAME2 may be greater than the limit current ILM, thus the panel current IEL of the second frame FRAME2 may be the overcurrent.

Since the panel current IEL of the second frame FRAME2 is greater than the limit current ILM, the normal mode may end and the overcurrent prevention mode may start. The overcurrent prevention mode may start from a first time point TP1 when the panel current IEL becomes greater than the limit current ILM. The panel current sensor 700 may generate an overcurrent alert signal ALT having an active level at the first time point TP1, and the driving controller 200 may generate an overcurrent prevention enable signal RUSH_EN having the active level based on the overcurrent alert signal ALT having the active level.

In the second frame FRAME2, the overcurrent prevention transistor TO may be turned on in response to the overcurrent prevention enable signal RUSH_EN having the active level, and the voltage gain of the non-inverting amplifier 825 is "1+R_R2/R_R1". Here, R_R1 is a resistance value of the first resistor R1, and R_R2 is a resistance value of the second resistor R2. In an embodiment, the resistance value of the second resistor R2 may be less than the resistance value of the first resistor R1. For example, "R_R2/R_R1" may be 0.4.

The digital-to-analog converter 810 may generate the code voltage VCODE based on the initialization voltage code VINT_CODE, and the initialization voltage VINT output from the initialization voltage generator may be equal to a second initialization voltage VINT2 which is a product of the code voltage VCODE and the voltage gain of the non-inverting amplifier 825 which is "1+R_R2/R_R1". The second initialization voltage VINT2 may be greater than the first initialization voltage VINT1. For example, the code voltage VCODE corresponding to the initialization voltage code VINT_CODE may be 6V, and the initialization voltage VINT output from the initialization voltage generator 800 may be 8.4V. When the overcurrent prevention mode starts, the initialization voltage VINT increases from the first initialization voltage VINT1 to the second initialization voltage VINT2 at the first time point TP1. The second initialization voltage VINT2 may be sequentially applied to the pixels PX on a row-by-row basis. For example, the initialization voltage VINT applied to 75% of the pixels PX during the second frame may change from the first initialization voltage VINT1 to the second initialization voltage VINT2 at the first time point TP1. Since the second initialization voltage VINT2 is sequentially applied to the pixels PX on the row-by-row basis, the driving current IDR of the pixels PX may sequentially decrease on the row-by-row basis. Therefore, the slope of the panel current IEL between the first time point TP1 and the second time point TP2 may be less than the slope of the panel current IEL between a starting point of the second frame FRAME2 and the first time point TP1. Additionally, the initialization voltage VINT increases significantly, such that a slope change of the panel current IEL may be large.

As such, when the panel current IEL is greater than the limit current ILM, the overcurrent prevention mode may start, and the initialization voltage VINT generated by the initialization voltage generator 800 may increase from the first initialization voltage VINT1 to the second initialization voltage VINT2 at the first time point TP1. Accordingly, the slope of the panel current IEL may decrease from the first time point TP1.

Whether the net power control operation is turned on in the second frame FRAME2 may be determined by the load LD of the input image data IMG of the first frame FRAME1, which is a previous frame. Since the load LD of the input image data IMG of the first frame FRAME1 is less than a limit load, the net power control operation may be turned off in the second frame FRAME2.

A load LD of input image data IMG of a third frame FRAME3 following the second frame FRAME2 may be 100%. The initialization voltage VINT generated by the initialization voltage generator 800 may decrease in the overcurrent prevention mode at a start time point of the third frame FRAME3 and then decrease again in the normal mode at a start time point of the fourth frame FRAME4 (at the fourth time point). In order to prevent a luminance change of the display panel 100 from being visible to a user, the initialization voltage VINT may gradually decrease from the VINT2 in the second frame FRAME2 to the VINT1 in the fourth frame FRAME4. For example, the overcurrent prevention mode may be maintained for two frames. Therefore, the overcurrent prevention mode may be maintained in the third frame FRAME3, and the driving controller 200 may generate the overcurrent prevention enable signal RUSH_EN having the active level in the third frame FRAME3.

In the third frame FRAME3, the overcurrent prevention transistor TO may be turned on in response to the overcurrent prevention enable signal RUSH_EN having the active level, and the voltage gain of the non-inverting amplifier 825 may be "1+R_R2/R_R1". For example, "R_R2/R_R1" may be 0.4.

The driving controller 200 may decrease an initialization voltage code VINT_CODE to generate a correction initialization voltage code VINT_CODE', and the digital-to-analog converter 810 may generate a correction code voltage VCODE' based on the correction initialization voltage code VINT_CODE'. The initialization voltage VINT generated by the initialization voltage generator 800 is equal to a third initialization voltage VINT3 which is a product of the correction code voltage VCODE' and the voltage gain of the non-inverting amplifier 825 which is "1+R_R2/R_R1". The third initialization voltage VINT3 may be greater than the first initialization voltage VINT1 and less than the second initialization voltage VINT2. For example, the correction code voltage VCODE' corresponding to the correction initialization voltage code VINT_CODE' may be 5V, and the initialization voltage VINT may be 7V. At a second time point TP2 in which the third frame FRAME3 starts, the initialization voltage VINT generated by the initialization voltage generator 800 may change from the second initialization voltage VINT2 to the third initialization voltage VINT3. The third initialization voltage VINT3 may be sequentially applied to the pixels PX by on row-by-row basis. For example, during the third frame FRAME3, the initialization voltage VINT which is applied to 25% of the pixels PX, excluding 75% of the pixels PX to which the second initialization voltage VINT2 is applied, may change from the second initialization voltage VINT2 to the third initialization voltage VINT3. Since the third initialization voltage VINT3 is sequentially applied to the pixels PX on the row-by-row basis, the driving current IDR of the pixels PX may sequentially decrease on the row-by-row basis. To reduce the panel current below the limit current ILM, the net power controller NPC is turned on at the beginning of the third frame FRAME3, for example, the time point TP2. Therefore, the slope of the panel current IEL may decrease at the second time point TP2. In addition, at a third time point TP3, the initialization voltage VINT, which is applied to 75% of the pixels PX to which the second initialization voltage VINT2 is applied, may change from the second initialization voltage VINT2 to the third initialization voltage VINT3. Since the third initialization voltage VINT3 is sequentially applied to the pixels PX on the row-by-row basis, the driving current IDR of the pixels PX may sequentially increase on the row-by-row basis. Therefore, the slope of the panel current IEL may increase at the third time point TP3.

Whether the net power control operation is turned on in the third frame FRAME3 may be determined by the load LD of the input video data IMG of the second frame FRAME2, which is a previous frame. Since the load LD of the input image data IMG of the second frame FRAME2 is greater than the limit load, the net power control operation may be turned on in the third frame FRAME3. The net power control operation may reduce a grayscale of the input image data IMG.

As such, the overcurrent prevention mode may be maintained, the initialization voltage VINT generated by the initialization voltage generator 800 may be gradually reduced, and the net power control operation may be turned on. Accordingly, the luminance change of the display panel 100 may be prevented from being visible to the user, and the grayscale of the input image data IMG may be reduced.

A load LD of input image data IMG of a fourth frame FRAME4 following the third frame FRAME3 may be 100%. When the overcurrent prevention mode is maintained for two frames, the overcurrent prevention mode may be end and the normal mode may start in the fourth frame FRAME4. The panel current sensor 700 may generate the overcurrent alert signal ALT having the inactive level, and the driving controller 200 may generate the overcurrent prevention enable signal RUSH_EN having the inactive level based on the overcurrent alert signal ALT having the inactive level.

The overcurrent prevention transistor TO may be turned off in response to the overcurrent prevention enable signal RUSH_EN having the inactive level, thus the voltage gain of the non-inverting amplifier 825 may be 1.

The driving controller 200 may increase the correction initialization voltage code VINT_CODE' to generate the initialization voltage code VINT_CODE, the digital-to-analog converter 810 may generate the code voltage based on the initialization voltage code VINT_CODE, the initialization voltage VINT generated by the initialization voltage generator 800 may be the first initialization voltage VINT1, which is the code voltage VCODE. For example, the code voltage VCODE corresponding to the initialization voltage code VINT_CODE may be 6V, and the initialization voltage VINT may be 6V.

Whether the net power control operation is turned on in the fourth frame FRAME4 may be determined by the load LD of the input video data IMG of the third frame FRAME3, which is a previous frame. Since the load LD of the input image data IMG of the third frame FRAME3 is greater than the limit load, the net power control operation may be turned on in the fourth frame FRAME4. Unlike the second frame FRAME2, the net power control operation is turned on in the fourth frame FRAME4, such that a panel current IEL of the fourth frame FRAME4 may not increase to the limit current ILM.

As such, the net power control operation may be turned on even if the overcurrent prevention mode is turned off and the normal mode is turned on. Accordingly, the panel current IEL may be maintained at a current less than the limit current ILM.

Figure 12:
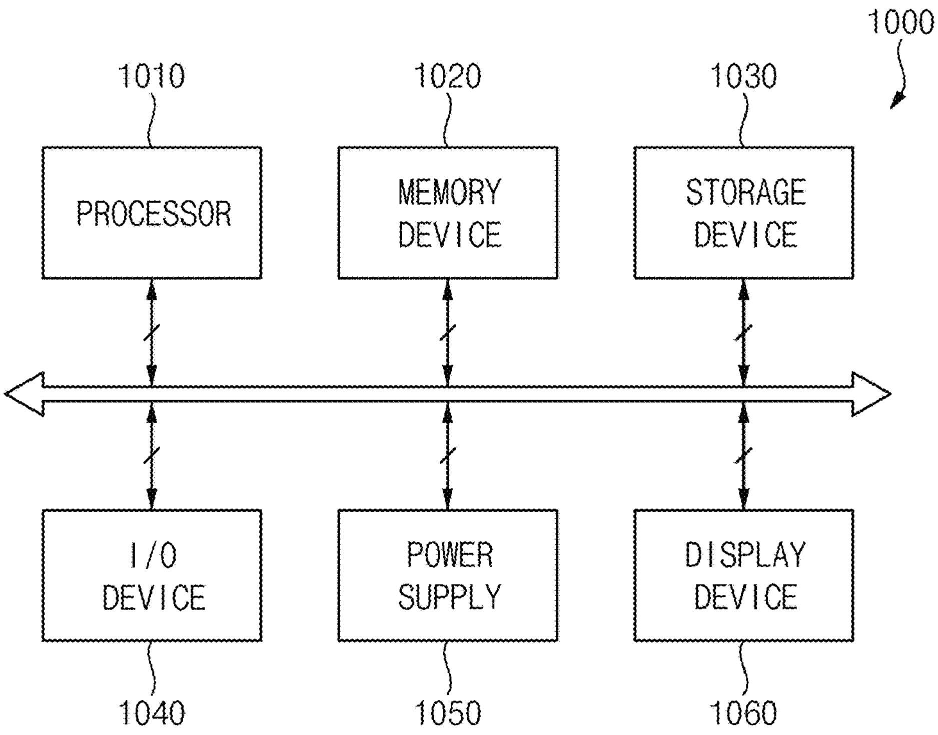
FIG. 12 is a block diagram illustrating an electronic device.
Figure 13:
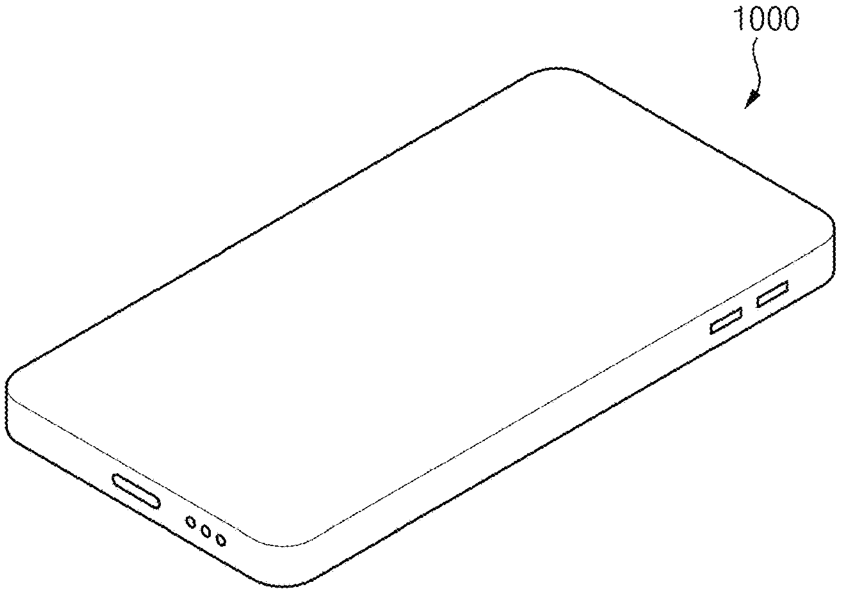
FIG. 13 is a diagram illustrating an embodiment in which the electronic device 1000 of FIG. 12 is implemented as a smart phone.

FIG. 12 is a block diagram illustrating an electronic device 1000. FIG. 13 is a diagram illustrating an embodiment in which the electronic device 1000 of FIG. 12 is implemented as a smart phone.

Referring to FIGS. 12 and 13, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 13, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (TIMID) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device, comprising:

a display panel including pixels;

a panel current sensor configured to sense a panel current of the display panel and generate an overcurrent alert signal when the panel current is greater than a limit current;

a driving controller configured to generate an overcurrent prevention enable signal for determining whether to turn on an overcurrent prevention mode based on the overcurrent alert signal; and an initialization voltage generator configured to control an initialization voltage applied to the pixels in response to the overcurrent prevention enable signal, wherein the initialization voltage generator includes:

an overcurrent prevention transistor turned on in response to the overcurrent prevention enable signal; and a non-inverting amplifier connected to the overcurrent prevention transistor and configured to generate the initialization voltage.

2. The display device of claim 1, wherein each of the pixels includes:

a first pixel transistor including a gate terminal connected to a first pixel node, a first terminal receiving a high power voltage, and a second terminal connected to a second pixel node;

a second pixel transistor including a gate terminal receiving a first gate signal, a first terminal receiving a data voltage, and a second terminal connected to the first pixel node;

a third pixel transistor including a gate terminal receiving a second gate signal, a first terminal receiving the initialization voltage, and a second terminal connected to the second pixel node;

a storage capacitor including a first terminal connected to the first pixel node and a second terminal connected to the second pixel node; and a light emitting element including an anode terminal connected to the second pixel node and a cathode terminal receiving a low power voltage lower than the high power voltage.

3. The display device of claim 1, wherein the overcurrent prevention transistor includes a gate terminal receiving the overcurrent prevention enable signal, a first terminal receiving a ground voltage, and a second terminal, and wherein the non-inverting amplifier includes:

a first resistor including a first terminal connected to the second terminal of the overcurrent prevention transistor and a second terminal;

a second resistor including a first terminal connected to the second terminal of the first resistor and a second terminal; and an amplifier including a non-inverting input terminal receiving a code voltage, an inverting input terminal connected to the second terminal of the first resistor and the first terminal of the second resistor, and an output terminal through which the initialization voltage is output.

4. The display device of claim 3, wherein a resistance value of the second resistor is less than a resistance value of the first resistor.

5. The display device of claim 3, wherein the overcurrent prevention transistor is an N-type transistor.

6. The display device of claim 3, wherein, when a panel current of a first duration is less than or equal to the limit current, the overcurrent prevention enable signal has an inactive level, the overcurrent prevention mode is turned off, and the initialization voltage is a first initialization voltage, and wherein, when a panel current of a second duration following the first duration is greater than the limit current, the overcurrent prevention enable signal has an active level, the overcurrent prevention mode is turned on, and the initialization voltage is a second initialization voltage higher than the first initialization voltage.

7. The display device of claim 6, wherein, in the first duration, the overcurrent prevention transistor is turned off in response to the overcurrent prevention enable signal having the inactive level, and a voltage gain of the non-inverting amplifier is 1.

8. The display device of claim 7, wherein, in the first duration, the initialization voltage output from the output terminal of the amplifier is the first initialization voltage.

9. The display device of claim 6, wherein, in the second duration, the overcurrent prevention transistor is turned on in response to the overcurrent prevention enable signal having the active level, and a voltage gain of the non-inverting amplifier is "1+R_R2/R_R1," where R_R1 is a resistance value of the first resistor, and R_R2 is a resistance value of the second resistor.

10. The display device of claim 9, wherein, in the second duration, the initialization voltage output from the output terminal of the amplifier is the second initialization voltage which is a product of the code voltage and the voltage gain of the non-inverting amplifier.

11. The display device of claim 6, wherein, in a third duration following the second duration, the overcurrent prevention enable signal has the active level, the overcurrent prevention mode is turned on, and the initialization voltage is a third initialization voltage greater than the first initialization voltage and less than the second initialization voltage.

12. The display device of claim 11, wherein the overcurrent prevention enable signal is generated based on the overcurrent alert signal, and wherein the initialization voltage generator further includes a digital-to-analog converter configured to generate the code voltage based on an initialization voltage code.

13. The display device of claim 12, wherein, in the third duration, the driving controller is configured to decrease the initialization voltage code to generate a correction initialization voltage code and the digital-to-analog converter is configured to generate a correction code voltage based on the correction initialization voltage code.

14. The display device of claim 13, wherein, in the third duration, the overcurrent prevention transistor is turned on in response to the overcurrent prevention enable signal having the active level, and a voltage gain of the non-inverting amplifier is "1+R_R2/R_R1," where R_R1 is a resistance value of the first resistor, and R_R2 is a resistance value of the second resistor.

15. The display device of claim 14, wherein, in the third duration, the initialization voltage output from the output terminal of the amplifier is the third initialization voltage which is a product of the correction code voltage and the voltage gain of the non-inverting amplifier.

16. A method of driving a display device, the method comprising:

sensing a panel current of a display panel including pixels;

generating an overcurrent alert signal when the panel current is greater than a limit current;

generating an overcurrent prevention enable signal for determining whether to turn on an overcurrent prevention mode based on the overcurrent alert signal; and outputting the overcurrent prevention enable signal to an initialization voltage generator, wherein the initialization voltage generator is configured to control an initialization voltage applied to the pixels in response to the overcurrent prevention enable signal, and wherein the initialization voltage generator includes:

an overcurrent prevention transistor turned on in response to the overcurrent prevention enable signal; and a non-inverting amplifier connected to the overcurrent prevention transistor and configured to generate the initialization voltage.

17. The method of claim 16, wherein the overcurrent prevention transistor includes a gate terminal receiving the overcurrent prevention enable signal, a first terminal receiving a ground voltage, and a second terminal, and wherein the non-inverting amplifier includes:

a first resistor including a first terminal connected to the second terminal of the overcurrent prevention transistor, and a second terminal;

a second resistor including a first terminal connected to the second terminal of the first resistor, and a second terminal; and an amplifier including a non-inverting input terminal receiving a code voltage, an inverting input terminal connected to the second terminal of the first resistor and the first terminal of the second resistor, and an output terminal through which the initialization voltage is output.

18. The method of claim 17, wherein, when a panel current of a first duration is less than or equal to the limit current, the overcurrent prevention enable signal has an inactive level, the overcurrent prevention mode is turned off, and the initialization voltage is a first initialization voltage, and wherein, when a panel current of a second duration following the first duration is greater than the limit current, the overcurrent prevention enable signal has an active level, the overcurrent prevention mode is turned on, and the initialization voltage is a second initialization voltage higher than the first initialization voltage.

19. The method of claim 18, wherein, in the first duration, the overcurrent prevention transistor is turned off in response to the overcurrent prevention enable signal having the inactive level, and a voltage gain of the non-inverting amplifier is 1.

20. The method of claim 18, wherein, in the second duration, the overcurrent prevention transistor is turned on in response to the overcurrent prevention enable signal having the active level, and a voltage gain of the non-inverting amplifier is "1+R_R2/R_R1," where R_R1 is a resistance value of the first resistor, and R_R2 is a resistance value of the second resistor.

21. The method of claim 18, wherein, in a third duration following the second duration, the overcurrent prevention enable signal has the active level, the overcurrent prevention mode is turned on, and the initialization voltage is a third initialization voltage greater than the first initialization voltage and less than the second initialization voltage.

22. The method of claim 21, wherein the overcurrent prevention enable signal is generated based on the overcurrent alert signal, and wherein the initialization voltage generator further includes a digital-to-analog converter configured to generate the code voltage based on an initialization voltage code.

23. The method of claim 22, wherein, in the third duration, the overcurrent prevention transistor is turned on in response to the overcurrent prevention enable signal having the active level, and a voltage gain of the non-inverting amplifier is "1+R_R2/R_R1," where R_R1 is a resistance value of the first resistor, and R_R2 is a resistance value of the second resistor.

24. An electronic device, comprising:

a display panel including pixels;

a panel current sensor configured to sense a panel current of the display panel and generate an overcurrent alert signal when the panel current is greater than a limit current;

a driving controller configured to generate an overcurrent prevention enable signal for determining whether to turn on an overcurrent prevention mode based on the overcurrent alert signal;

an initialization voltage generator configured to control an initialization voltage applied to the pixels in response to the overcurrent prevention enable signal; and a processor configured to control the driving controller, wherein the initialization voltage generator includes:

an overcurrent prevention transistor turned on in response to the overcurrent prevention enable signal; and a non-inverting amplifier connected to the overcurrent prevention transistor and configured to generate the initialization voltage.

* * * * *